Patented Dec. 13, 1949

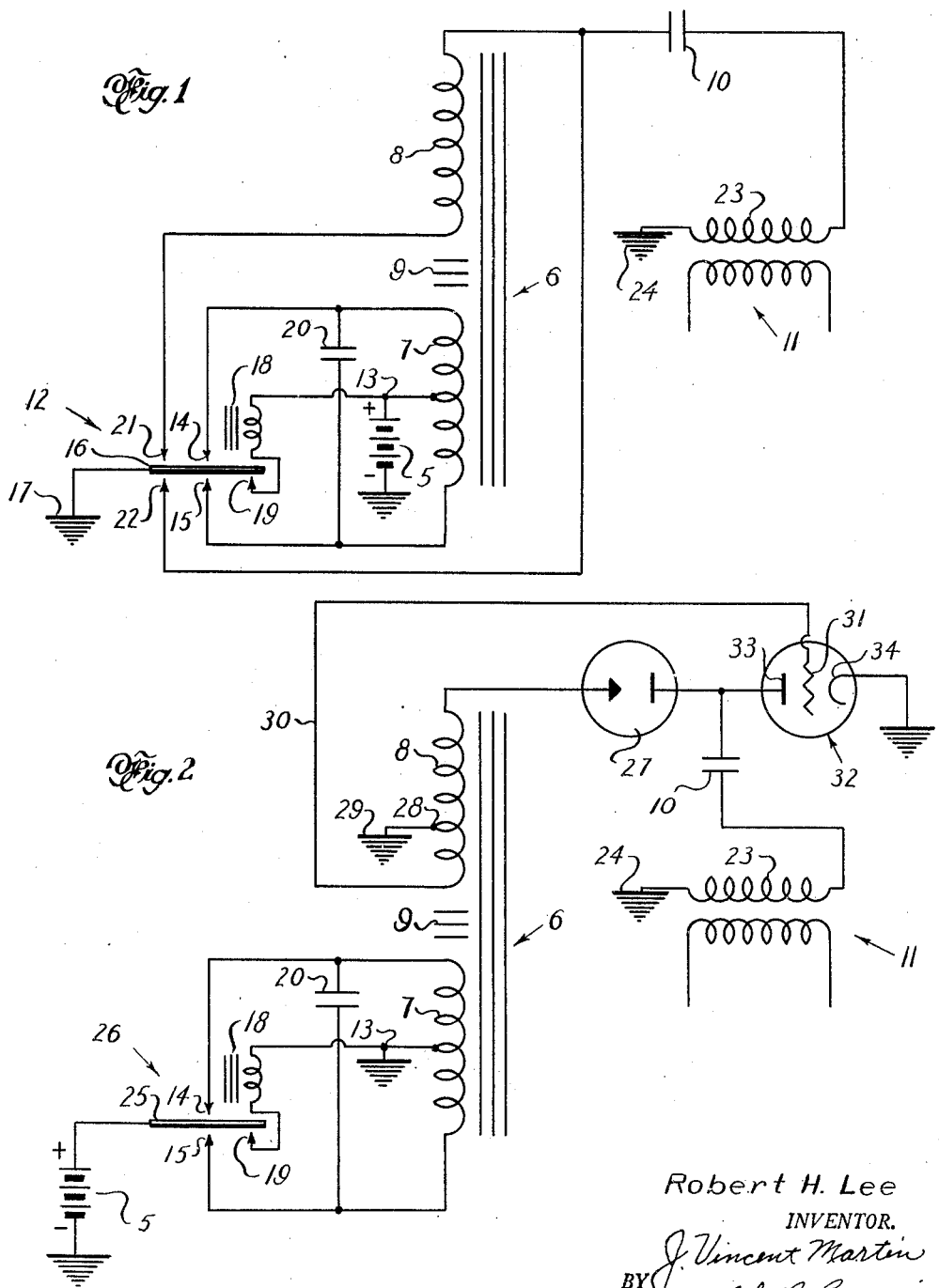

2,491,382

UNITED STATES PATENT OFFICE 2,491,382

ELECTRIC IMPULSE GENERATOR

Robert H. Lee, Indianapolis, Ind., assignor to Dick E. Stearns, Shreveport, La.

Application May 12, 1948, Serial No. 26,575

12 Claims. (Cl. 320—1)

This invention relates to improvements in circuits for charging a condenser and refers more particularly to a circuit wherein a condenser is efficiently charged and may be discharged into a load circuit to generate electrical impulses in the load.

In certain uses for electric impulse generators it is desirable to provide the electric impulse generator in as small a unit as possible. Also, it is important that the drain upon the primary power source which usually is in the form of a storage battery, be kept to a minimum and for this reason it is preferred that the circuit for generating the impulse be as efficient as possible. An example of such use for impulse generating equipment is in the testing of insulating material which coats a pipe line wherein test equipment is employed to subject the insulation material covering the pipe line to a test voltage.

An object of this invention is to provide a means for efficiently charging a condenser.

Another object is to provide a means for efficiently generating an electric impulse.

Still another object is to provide equipment for efficiently charging a condenser wherein the equipment is in a compact and lightweight unit.

Still a further object is to provide equipment for generating an electric impulse in an efficient manner with a small compact lightweight unit.

Yet another object is to provide an electric impulse generator employing a source of direct current wherein a condenser is included in series in a circuit having an inductive reactance and a single vibrator controls the conversion of the D. C. voltage into the desired output voltage, prevents back flow of current from the condenser, and controls the discharge of the condenser into the load circuit.

Even another object is to provide a condenser charging circuit employing a transformer arrangement to convert a D. C. voltage to a desired voltage and also providing an inductive reactance in the circuit containing the condenser wherein the inductive reactance functions electrically as though it were in series connection with the condenser.

Other and further objects of this invention will appear from the description.

In the accompanying drawings, which form a part of the instant specification, are to be read in conjunction therewith, and wherein like reference numerals are employed to indicate like parts in the various views:

Fig. 1 is a circuit diagram illustrating an electric impulse generator embodying this invention; and Fig. 2 is a circuit diagram illustrating a modified circuit in accordance with this invention.

Referring to the drawings, it is believed that the circuit may be more readily understood by first listing the principal components of the circuit. These components include a D. C. energy source 5 which may be any suitable storage battery; a transformer indicated generally at 6, including a primary coil 7, a secondary coil 8, and a shunt 9, which provides a control of inductive reactance between the two coils; a condenser to be charged 10, a load circuit shown as a transformer 11; and a vibratory control switch shown generally at 12.

It it desirable to charge efficiently the condenser 10 and to this end there is provided in the circuit an inductive reactance which functions electrically as though it were in series with the condenser and with the voltage source. Also the circuit is provided with a means for preventing back flow of current from the condenser and to intermittently discharge the condenser into the load circuit.

The transformer shown generally at 6 provides a part of the means for converting the D. C. potential to a desired potential for charging the condenser 10 and also provides at least in part the inductive reactance which acts as if it were in series with the condenser and the D. C. power source.

Referring to the connection and the control for the transformer 6, primary coil 7 has a center tap 13 which is electrically connected with the positive pole of power source 5. The ends of the coil 7 are connected by suitable leads to contacts 14 and 15, respectively, of vibrator 12. These contacts are adapted to be periodically engaged by vibratory reed 16 of the vibratory switch 12. This reed is grounded at 17 and is actuated by electromagnet 18 and contact 19. The magnet coil is connected to the positive pole of energy source 5 and by contact 19 and reed 16 to the ground at 17.

A condenser 20 is connected across the ends of the primary coil to provide a source of magnetizing current for the primary coil during the time that the reed 16 travels from one of the contacts 14 and 15 to the other of the contacts. This protects the vibratory contacts 14 and 15 from voltage transients that they would otherwise be subjected to.

With this arrangement the vibratory switch 12 controls the energization of primary coil 7 so that the coil is alternately energized, first with one polarity of voltage and then the reverse polarity of voltage, to produce a magnetic flux and induce an alternating potential in the secondary coil 8 of the transformer. This alternating potential serves to charge condenser 10 and a rectifier is inserted in the circuit to prevent back flow of current from the condenser. This rectifier in this circuit is also provided by the vibratory switch 12. This is accomplished by connecting one end of coil 8 to the condenser 10 and the other end of the coil to a contact 21, which is engaged by vibratory reed 16 at the same time that the reed engages contact 14. Thus, the circuit, including coil 8 and condenser 10, is closed when the reed engages contact 21 and is open when the reed is not so engaged. In order to efficiently charge the condenser a means providing an inductive reactance is included in the circuit. In this embodiment of the invention, this inductive reactance is included entirely within transformer 6 and is provided primarily by the shunt 9. This inductive reactance is not in a physical series connection with condenser 10 but electrically it functions as though it were in series connection therewith.

The inductive reactance of the circuit must be greater than the resistance of the circuit if it is to have any material effect upon the charging of the condenser. For most purposes the Q of the circuit will exceed 5. Preferably, the total amount of inductive reactance in the circuit should be substantially equal to the reactance of the condenser at the frequency of the vibratory reed 16, or in other words, the frequency of the alternating potential induced in secondary coil 8. The effect of this arrangement and balance of components is to substantially double the voltage charge of the condenser.

For efficient operation of the condenser charging system and the electric impulse generator, it is necessary to discharge the condenser into the load circuit at a time when it has substantially obtained its peak charge. Means are provided in the circuit for accomplishing this and in this embodiment of the invention, the vibratory switch 12 also controls the intermittent discharge of the condenser into the load circuit. This may be accomplished by providing a contact 22 electrically connected in the circuit between secondary coil 8 and condenser 10. This contact 22 is positioned to be engaged by reed 16 at a time when the reed is disengaged from contact 21 or during the time that the condenser charging circuit is open. When the reed engages contact 22 the condenser discharges through the contact, reed 16 into the ground at 17, and energizes the primary coil 23 of the load transformer which is grounded at 24 and has its other end connected to the plate of condenser 10 which is at ground potential during the charging cycle.

In the modification shown in Fig. 2, the major components including transformer 6, condenser 10 and load transformer 11 are the same as shown in Fig. 1, but the circuit is controlled by a somewhat modified arrangement. A center tap 13 of the primary coil 7 is connected to ground and the vibratory reed 25 of a modified vibratory switch shown generally at 26 is connected to the positive pole of the power source 5. The contacts 14 and 15 carried at the ends of the primary coil 7 are adapted to be periodically engaged by the reed 25 to energize coil 7 in such fashion as to induce an alternating potential in the secondary coil. The vibratory switch 26 is the conventional four contact switch available commercially and does not serve to directly control the back flow of current from the condenser 10 or the discharge of the condenser into the load circuit. However, this single vibratory switch does serve as the sole indirect control for the entire circuit.

The back flow of current from the condenser 10 is prevented by utilizing a current rectifier 27 and is connected in series with condenser 10. The secondary coil of the transformer has a tap 28 which is grounded at 29 and one end of the coil is connected by lead 30 to the grid 31 of a gas triode tube 32. The plate 33 of the gas triode tube is connected to the charged plate of condenser 10. The cathode 34 of the tube is grounded. The tube connected in this manner is adapted to intermittently discharge condenser 10 into a load circuit. This discharge is caused to occur when the charge upon condenser 10 is substantially at its peak and this discharge is indirectly controlled by the vibratory switch 26.

In operation of this modified circuit, the vibratory reed is set in motion at a pre-determined frequency under the influence of electro-magnet 18 and contact 19. When the reed engages contact 14, primary coil 7 is energized with one polarity. Upon engagement of the reed with contact 15, the coil is again energized but with a reverse polarity and during this operation condenser 20 provides magnetizing current to the primary winding while the reed is traversing the distance between contacts 14 and 15.

This reversal of polarity induces an alternating potential in secondary coil 8 and during one half cycle of this induced potential the condenser 10 is charged. During the other half cycle the rectifier 27 prevents back flow of current from the condenser. During this latter half cycle the grid 31 of the gas triode tube is driven positive to render the gas of the tube conductive. This permits discharge of the charged plate of the condenser 10 through plate 33, the gas within tube 32 and the cathode 34 to the ground and thence through the primary coil 23 of the load circuit to the other plate of condenser 10. The grid of the tube 32 is rendered negative during the half cycle the condenser is charged and thus the condenser cannot discharge through the tube 32 until the other half cycle is again reached.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. A condenser charging system comprising a means for providing a source of alternating current, a condenser to be charged, an inductive reactance in the circuit, means for preventing back flow of current from the condenser, all of the above elements connected in the circuit in such manner as to function electrically as though they were series connected, the inductive reactance in the circuit being substantially equal to the reactance of the condenser at the frequency of the alternating current, and means tuned to the frequency of the condenser charging portion of the circuit for discharging the condenser into a load circuit when the condenser has substantially attained its peak charge.

2. An impulse generator comprising a source of D. C. potential, a means including a vibrator to convert the D. C. potential to A. C. at a selected potential and frequency, a condenser to be charged, an inductive reactance in the circuit greater than the resistance in the circuit, means to prevent back flow of current from the condenser, and means including said vibrator for intermittently discharging the condenser into a load circuit during the portion of the vibratory cycle that the condenser is not receiving a charge, said condenser, means for preventing back flow of current, and inductive reactance all connected in the system in such manner as to function electrically as though they were series connected.

3. An impulse generator comprising a source of D. C. potential; a means including a vibrator to convert the D. C. potential to A. C. at a selected potential and frequency; a condenser to be charged; an inductive reactance in the circuit, said inductive reactance substantially equal to the reactance of the condenser at the selected A. C. frequency, means including said vibrator to prevent back flow of current from the condenser; and means including said vibrator for intermittently discharging the condenser into a load circuit during the portion of the vibrator cycle that the condenser is not receiving a charge; said condenser, means for preventing back flow of current, and inductive reactance all connected in the system in such manner as to function electrically as though they were series connected.

4. An impulse generator comprising a source of D. C. potential; a means including a vibrator to convert the D. C. potential to A. C. at a selected potential and frequency; a condenser to be charged; an inductive reactance in the circuit, said inductive reactance substantially equal to the reactance of the condenser at the selected A. C. frequency; means including said vibrator to prevent back flow of current from the condenser; and means for intermittently discharging the condenser into a load circuit when the condenser has substantially reached a peak charge; said condenser, means for preventing back flow of current, and inductive reactance all connected in the system in such manner as to function electrically as though they were series connected.

5. An impulse generator comprising a source of D. C. potential, a reactance transformer having primary and secondary coils with a selected reactance therebetween, a vibratory switch adapted to intermittently connect the primary coil with the potential source to produce an alternating potential in the secondary, a condenser connected in series with the secondary coil, means in series with the condenser to prevent back flow of current from the condenser and means for intermittently discharging the condenser into the load circuit substantially at the time the condenser reaches a peak charge, said selected reactance substantially equal to the reactance of the condenser at the frequency of the alternating potential.

6. An impulse generator as in claim 5 wherein the primary coil has a central tap connected to one pole of the D. C. potential and the vibratory switch is operative to alternately connect the other pole of the D. C. potential to the ends of the primary coil.

7. An impulse generator comprising a source of D. C. potential, a reactance transformer having primary and secondary coils with a selected reactance therebetween, a condenser in series with the secondary coil, a single vibratory switch having a plurality of contacts, part of the contacts adapted to make connection between the primary coil and the source of D. C. potential to provide for energization of the primary coil with alternating current, other of the contacts in series with the secondary coil and the condenser and adapted to make a connection therethrough during the time that the primary coil is energized in one polarity and opening the connection therethrough during the remainder of the cycle and the rest of the contacts providing a connection through the condenser and the load circuit durnig the time the connection between the condenser and secondary coil is open, said selected reactance having substantially the same value as the reactance of the condenser at the frequency of the vibratory switch.

8. An impulse generator comprising a source of D. C. potential, a reactance transformer having primary and secondary coils with a selected reactance therebetween a condenser in series with the secondary coil, means preventing back flow of current from the condenser, a load circuit and a single vibratory switch having a plurality of contacts, part of the contacts adapted to make connection between the primary coil and the source of D. C. potential to provide for energization of the primary coil with alternating current, the rest of the contacts providing a connection through the condenser and the load circuit at a time that the condenser has substantially reached its peak charge, said selected reactance having substantially the same value as the reactance of the condenser at the frequency of the vibratory switch.

9. An impulse generator comprising a source of D. C. potential, a reactance transformer having primary and secondary coils with a selected reactance therebetween, a condenser in series with the secondary coil, a load circuit, and a single vibratory switch having a plurality of contacts, part of the contacts adapted to make connection between the primary coil and the source of D. C. potential for energization of the primary coil with alternating current, other of the contacts in series with the secondary coil and the condenser and adapted to make a connection therethrough during the time that the primary coil is energized in one polarity and opening the connection therethrough during the remainder of the cycle, and means for discharging the condenser substantially at the time that the condenser has reached its peak charge, said selected reactance having substantially the same value as the reactance of the condenser at the frequency of the vibratory switch.

10. In a circuit usable for generating electrical impulses, a transformer with primary and secondary coils, a vibratory switch, a condenser connected in series with the secondary coil of the transformer, means for preventing back flow of current from the condenser, an inductive reactance in the circuit adapted to function electrically as though it were in series with the condenser and being equal to the reactance of the condenser at the frequency of the induced potential in the secondary coil, said vibratory switch having contacts providing a means for intermittently completing a circuit for energizing the primary coil with alternating current and having other contacts providing means for intermittently connecting the condenser to a load circuit during the part of the vibratory cycle that the condenser is not receiving a charge.

11. In a circuit usable for generating electrical impulses, a transformer with primary and secondary coils, a vibratory switch, a condenser connected in series with the secondary coil of the transformer, an inductive reactance in the circuit adapted to function electrically as though it were in series with the condenser and being equal to the reactance of the condenser at the frequency of the induced potential in the secondary coil, said vibratory switch having contacts providing a means for intermittently completing a circuit for energizing the primary coil with an alternating potential, said vibratory switch having additional contacts providing means for preventing back flow of current from the condenser when the primary coil of the transformer is energized in one polarity and means for intermittently connecting the condenser to a load circuit during the part of the vibratory cycle that the back flow prevention means is operative.

12. A condenser charging system comprising a means for converting current from a D. C. source into A. C. of a predetermined potential and frequency, a condenser to be charged, an inductive reactance in the circuit at least as great as the resistance in the circuit, means for preventing back flow of current from the condenser, all of the above elements connected in the circuit in such manner as to function electrically as though they were series connected, the inductive reactance in the circuit being substantially equal to the reactance of the condenser at the frequency of the alternating current.

ROBERT H. LEE.

REFERENCES CITED

The following references are of record in the file of this patent:

UNITED STATES PATENTS

| Number | Name | Date |
| --- | --- | --- |
| Re. 22,572 | Miller | Nov. 28, 1944 |
| 2,085,100 | Knowles et al. | June 29, 1937 |
| 2,145,724 | Horsley | Jan. 31, 1939 |
| 2,269,460 | Klemperer | Jan. 13, 1942 |
| 2,411,898 | Schelleng | Dec. 3, 1946 |
| 2,428,390 | Smith | Oct. 7, 1947 |